United States Patent
Dykstra et al.

(10) Patent No.: US 10,428,618 B2
(45) Date of Patent: Oct. 1, 2019

(54) ROTATIONAL MOTION-INDUCING VARIABLE FLOW RESISTANCE SYSTEMS HAVING A SIDEWALL FLUID OUTLET AND METHODS FOR USE THEREOF IN A SUBTERRANEAN FORMATION

(75) Inventors: Jason D. Dykstra, Carrollton, TX (US); Michael L. Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 77 days.

(21) Appl. No.: 13/642,871

(22) PCT Filed: Nov. 10, 2011

(86) PCT No.: PCT/US2011/060087
§ 371 (c)(1),
(2), (4) Date: Jun. 18, 2014

(87) PCT Pub. No.: WO2013/070219
PCT Pub. Date: May 16, 2013

(65) Prior Publication Data
US 2014/0290776 A1 Oct. 2, 2014

(51) Int. Cl.
*E21B 34/06* (2006.01)
*F16K 35/06* (2006.01)
(Continued)

(52) U.S. Cl.
CPC .............. *E21B 34/06* (2013.01); *E21B 43/12* (2013.01); *E21B 43/32* (2013.01); *F15C 1/02* (2013.01);
(Continued)

(58) Field of Classification Search
CPC .......... E21B 34/06; E21B 43/32; E21B 43/12; F15C 1/02; Y10T 137/2098; Y10T 137/2087; Y10T 29/49826; G01F 1/32
See application file for complete search history.

(56) References Cited

U.S. PATENT DOCUMENTS 3,207,168 A * 9/1965 Warren ..................... F15C 1/02
137/809
3,216,439 A * 11/1965 Manion ..................... F15C 1/16
137/810

(Continued)

FOREIGN PATENT DOCUMENTS

| CA | 1264305 A | 1/1990 |
| CA | 2782343 A1 | 6/2011 |

(Continued)

OTHER PUBLICATIONS

International Search Report and Written Opinion for PCT/US2011/060087 dated Aug. 3, 2012.
(Continued)

*Primary Examiner* — Mary E McManmon
*Assistant Examiner* — Patrick Williams
(74) *Attorney, Agent, or Firm* — McGuireWoods LLP

(57) ABSTRACT

Variable flow resistance systems can be used to regulate fluid flow in various applications, particularly within a subterranean formation. A variable flow resistance system can comprise a chamber configured to induce rotational motion of a fluid flowing therethrough, a fluid inlet coupled to the chamber, and a fluid outlet coupled to the chamber that allows the fluid to exit through at least a sidewall of the chamber. If desired, a plurality of the chambers can be connected in series fluid flow communication with one another.

8 Claims, 14 Drawing Sheets

(51) Int. Cl.
*F16K 7/16* (2006.01)
*E21B 43/12* (2006.01)
*E21B 43/32* (2006.01)
*F15C 1/02* (2006.01)
*F15D 1/00* (2006.01)
*F16K 31/50* (2006.01)
*F16K 7/12* (2006.01)

(52) U.S. Cl.
CPC ............ *F15D 1/0015* (2013.01); *F16K 7/126* (2013.01); *F16K 7/16* (2013.01); *F16K 31/504* (2013.01); *F16K 31/508* (2013.01); *F16K 35/06* (2013.01); *Y10T 29/49826* (2015.01); *Y10T 137/2087* (2015.04); *Y10T 137/2098* (2015.04)

(56) References Cited

U.S. PATENT DOCUMENTS

| | | | | |
|---|---|---|---|---|
| 3,461,897 | A | | 8/1969 | Kwok |
| 3,521,657 | A | * | 7/1970 | Ayers ........................ F15C 1/16 137/813 |
| 3,670,753 | A | | 6/1972 | Healey |
| 4,131,134 | A | * | 12/1978 | Lindberg .................. F15C 1/16 137/808 |
| 5,303,482 | A | * | 4/1994 | Yamashita ........ H01L 21/67769 34/218 |
| 5,303,782 | A | | 4/1994 | Johannessen |
| 7,578,343 | B2 | | 8/2009 | Augustine |
| 8,128,127 | B2 | * | 3/2012 | Flynn ........................ F15D 1/04 285/129.1 |
| 9,051,724 | B2 | * | 6/2015 | Andoh .................... E03F 5/106 |
| 2004/0251211 | A1 | | 12/2004 | Suddath |
| 2007/0028977 | A1 | * | 2/2007 | Goulet ...................... F15C 1/16 137/809 |
| 2011/0042092 | A1 | | 2/2011 | Fripp et al. |
| 2011/0139453 | A1 | * | 6/2011 | Schultz .................. E21B 43/12 166/272.3 |
| 2011/0186300 | A1 | | 8/2011 | Dykstra et al. |
| 2011/0214876 | A1 | | 9/2011 | Dykstra et al. |
| 2012/0048563 | A1 | | 3/2012 | Holderman |
| 2012/0261012 | A1 | | 10/2012 | Andoh et al. |

FOREIGN PATENT DOCUMENTS

| | | |
|---|---|---|
| CN | 1535248 A | 10/2004 |
| DE | 971622 C | 2/1959 |
| DE | 1229347 B | 11/1966 |
| GB | 2207257 A | 1/1989 |
| WO | 02096810 A1 | 12/2002 |
| WO | 2013066295 A1 | 5/2013 |
| WO | 2013070182 A1 | 5/2013 |
| WO | 2013070219 A1 | 5/2013 |

OTHER PUBLICATIONS

Official Action for European Parent Application No. 11875577.6 dated Jan. 21, 2016.
Official Action for Chinese Patent Application 201180074339.0 dated Sep. 29, 2015.
European Office Action from European Application No. 11875577.6, dated Apr. 21, 2017.
Official Action for Canadian Patent Application No. 2,852,423 dated Feb. 18, 2016.

* cited by examiner

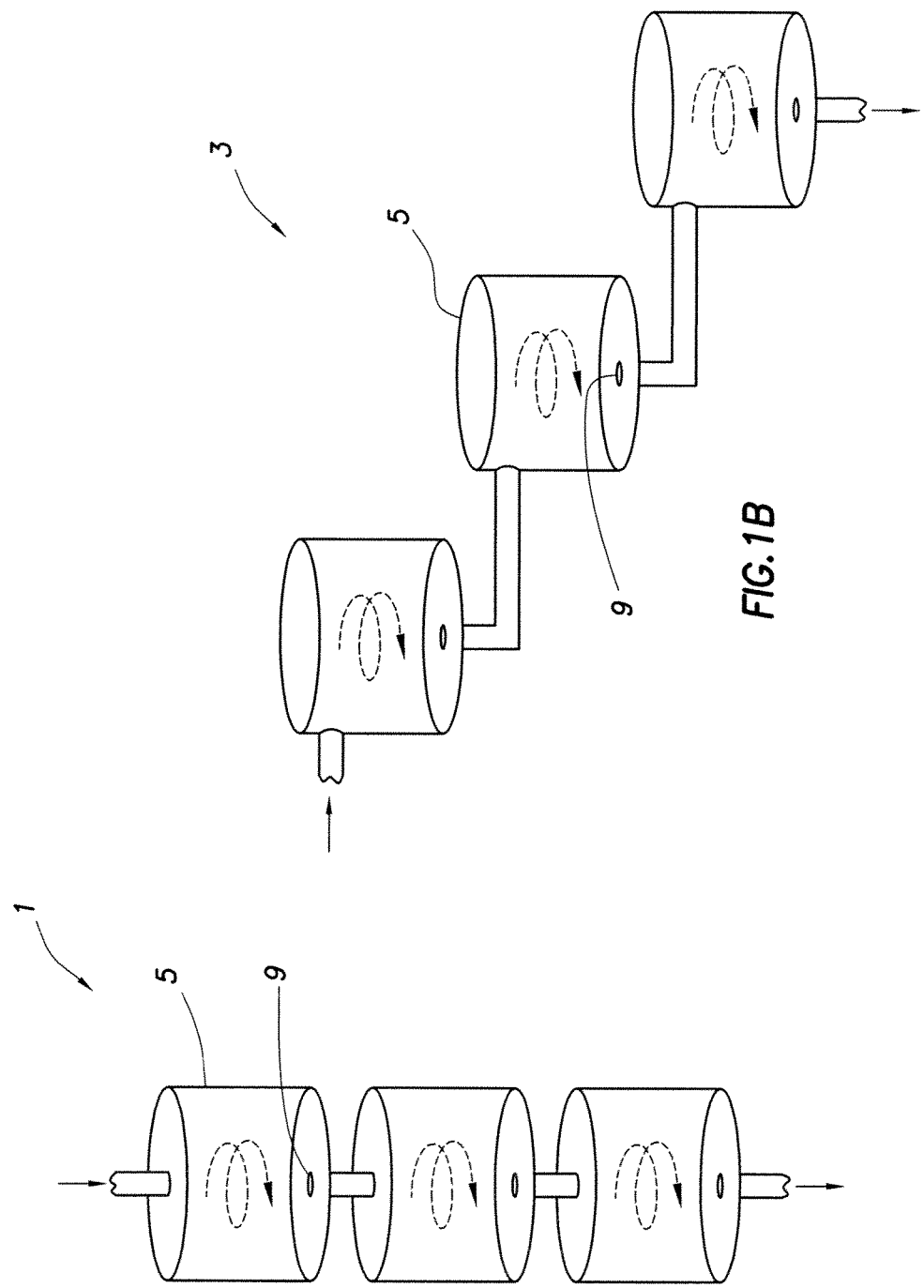

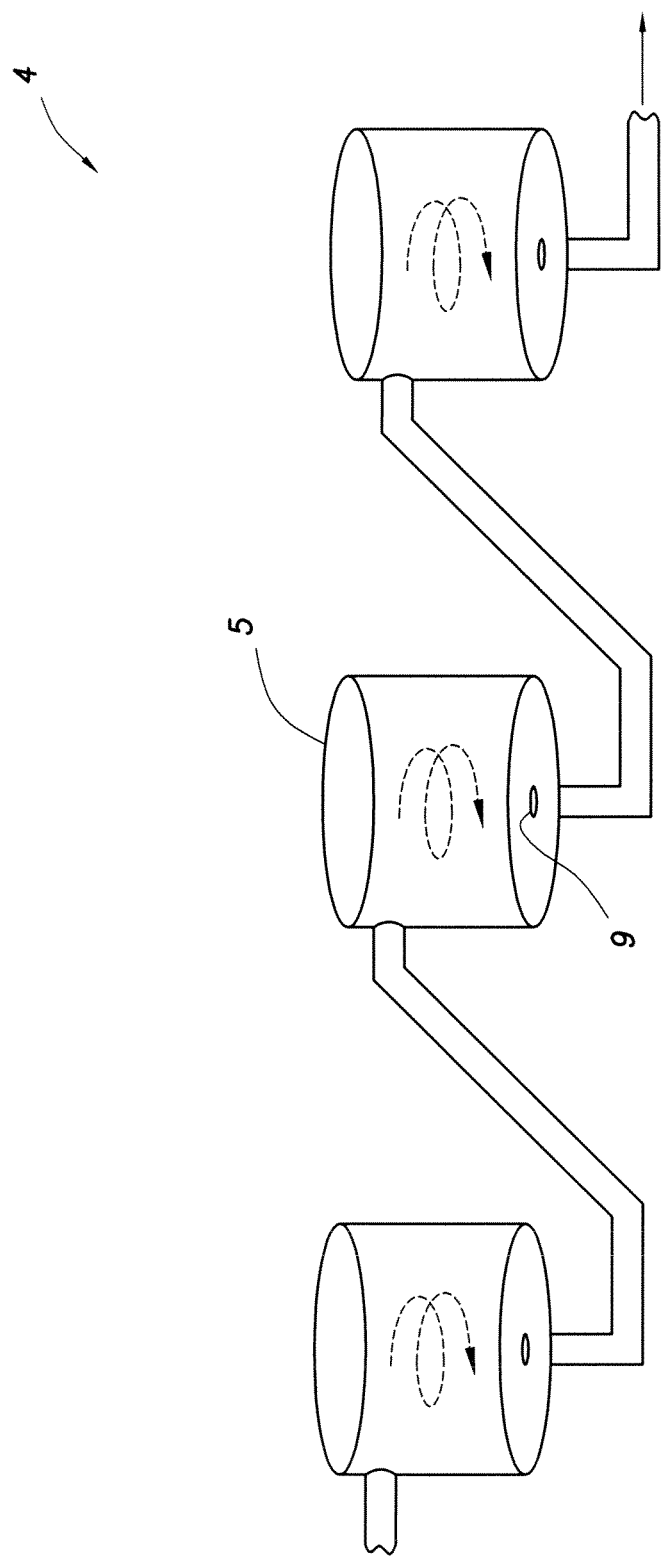

ROTATIONAL MOTION-INDUCING VARIABLE FLOW RESISTANCE SYSTEMS HAVING A SIDEWALL FLUID OUTLET AND METHODS FOR USE THEREOF IN A SUBTERRANEAN FORMATION

BACKGROUND

The present invention generally relates to systems and methods for regulating fluid flow, particularly within a subterranean formation, and, more specifically, to rotational motion-inducing variable flow resistance systems having a sidewall fluid outlet that allows the variable flow resistance systems to be connected in series fluid communication with one another.

It can often be beneficial to regulate the flow of formation fluids within a wellbore penetrating a subterranean formation. A variety of reasons or purposes can necessitate such regulation including, for example, prevention of water and/or gas coning, minimizing water and/or gas production, minimizing sand production, maximizing oil production, balancing production from various subterranean zones, equalizing pressure among various subterranean zones, and/or the like.

Likewise, it can also be beneficial to regulate the flow of injection fluids such as, for example, water, steam or gas, within a wellbore penetrating a subterranean formation. Regulation of the flow of injection fluids can be particularly useful, for example, to control the distribution of the injection fluid within various subterranean zones and/or to prevent the introduction of injection fluid into currently producing zones.

A number of different types of flow resistance systems have been developed in order to meet the foregoing needs. Many of these flow resistance systems are variable flow resistance systems that can restrict the passage of some fluids more than others based upon one or more physical property differences between the fluids. Illustrative physical properties of a fluid that can determine its rate of passage through a variable flow resistance system can include, for example, viscosity, velocity and density. Depending on the type, composition and physical properties of a fluid or fluid mixture whose passage is to be restricted, variable flow resistance systems can be configured such that higher ratios of a desired fluid to an undesired fluid can flow through a flow pathway containing the variable flow resistance system.

Rotational motion can be particularly effective for variably restricting fluid flow within a variable flow resistance system. In variable flow resistance systems capable of inducing rotational motion, a fluid composition most often enters a chamber within the variable flow resistance system in such a way that an undesired component of the fluid composition undergoes greater rotational motion than does a desired component of the fluid composition. As a result, the undesired component traverses a longer flow pathway than does the desired component, and the undesired component's residence time within the variable flow resistance system can be increased. Most often, the variable flow resistance system is configured such that fluid exiting the variable flow resistance system is discharged through a hole in the bottom of the chamber. Although such an arrangement of the exit hole can be particularly effective for inducing vortex-like rotational motion within a fluid, it significantly complicates the coupling of multiple chambers to one another in linear series.

Multiple chambers having a bottom exit hole can be series connected to form an operable variable flow resistance system, but the resulting arrangement of the chambers can be inefficient in terms of space utilization. For example, FIGS. 1A-1C show side view schematics of several possible arrangements of multiple chambers having a bottom exit hole that are in series connection with one another. As shown in FIGS. 1A and 1B, bottom exit hole 9 of chamber 5 within variable flow resistance systems 1 and 3 can particularly lend itself to vertical (FIG. 1A) or stepped-vertical (FIG. 1B) arrangements of the chambers. In confined locales, such as, for example, within a wellbore, such arrangements can prove problematic in terms of available space utilization. As shown in FIG. 1C, a substantially horizontal arrangement of chambers having a bottom exit hole within variable flow resistance system 4 is possible, at least in principle. However, the substantially horizontal arrangement of chambers shown in FIG. 1C can also prove problematic by requiring a vertical movement of fluid during transit between adjacent chambers.

SUMMARY OF THE INVENTION

The present invention generally relates to systems and methods for regulating fluid flow, particularly within a subterranean formation, and, more specifically, to rotational motion-inducing variable flow resistance systems having a sidewall fluid outlet that allows the variable flow resistance systems to be connected in series fluid communication with one another.

In some embodiments, the present invention provides a variable flow resistance system comprising: a chamber configured to induce rotational motion of a fluid flowing therethrough; a fluid inlet coupled to the chamber; and a fluid outlet coupled to the chamber that allows the fluid to exit through at least a sidewall of the chamber.

In other embodiments, the present invention provides a variable flow resistance system comprising: a plurality of chambers that are connected in series fluid communication with one another, each chamber having a fluid inlet and a fluid outlet coupled thereto; wherein at least some of the chambers are configured to induce rotational motion of a fluid flowing therethrough; and wherein the fluid outlets of at least some of the chambers are configured to allow the fluid to exit through at least a sidewall of the chamber.

In still other embodiments, the present invention provides a method comprising: installing a wellbore pipe in an uncompleted wellbore; wherein the wellbore pipe comprises at least one variable flow resistance system in fluid communication with the interior of the wellbore pipe, each variable flow resistance system comprising: a plurality of chambers that are connected in series fluid communication with one another, each chamber having a fluid inlet and a fluid outlet coupled thereto; wherein at least some of the chambers are configured to induce rotational motion of a fluid flowing therethrough; and wherein the fluid outlets of at least some of the chambers are configured to allow the fluid to exit through at least a sidewall of the chamber.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive or preferred embodiments. The subject matter disclosed is capable of considerable modification, alteration, and equivalents in form and function, as will occur to one having ordinary skill in the art and having the benefit of this disclosure.

FIGS. 1A-1C show side view schematics of several possible arrangements of multiple chambers having a bottom exit hole that are in series connection with one another.

DETAILED DESCRIPTION

Figure 2:
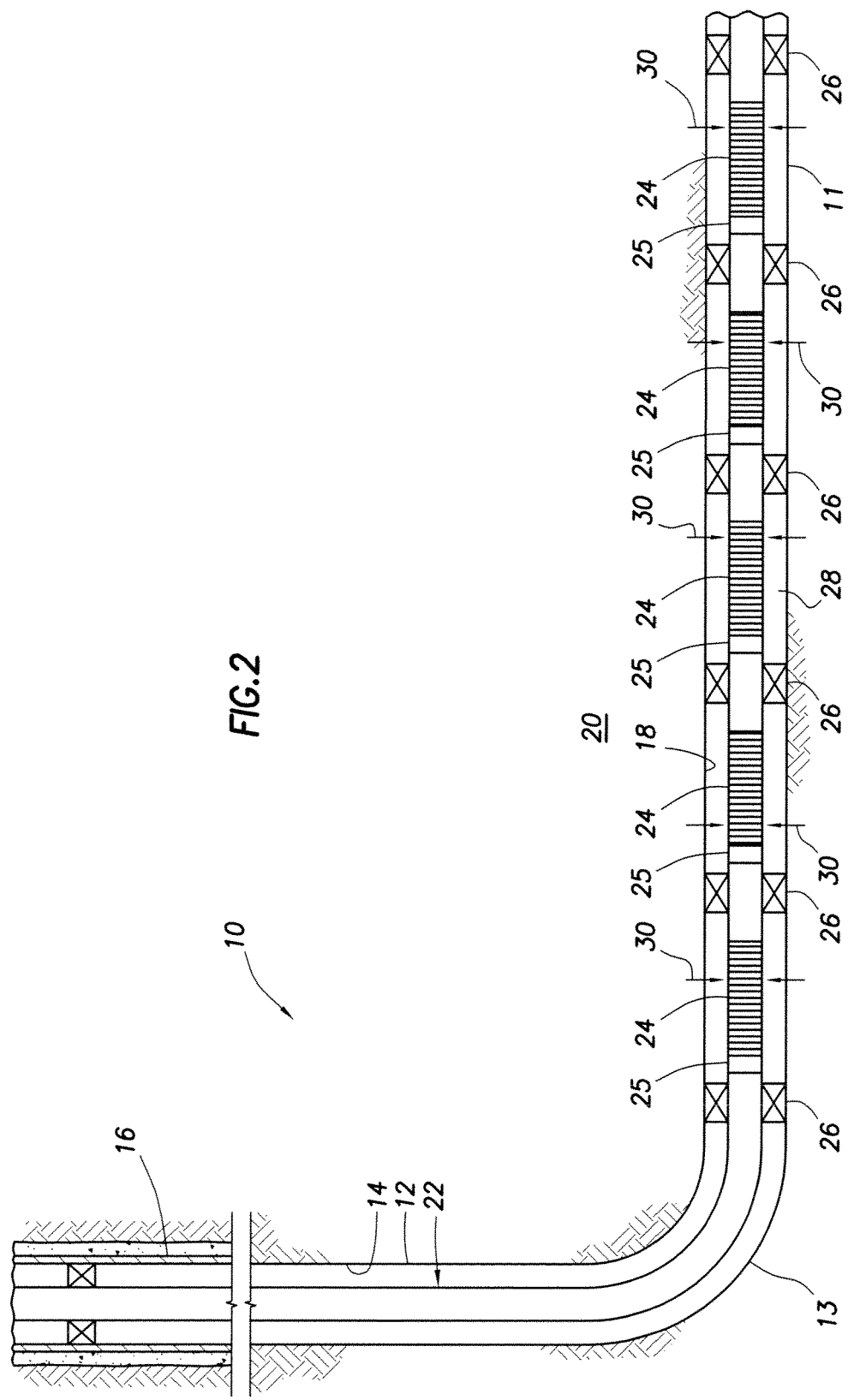
FIG. 2 shows a partial cross-sectional schematic of wellbore in which the variable flow resistance systems of the present disclosure can be used.

The present invention generally relates to systems and methods for regulating fluid flow, particularly within a subterranean formation, and, more specifically, to rotational motion-inducing variable flow resistance systems having a sidewall fluid outlet that allows the variable flow resistance systems to be connected in series fluid communication with one another.

As discussed above, variable flow resistance systems that induce rotational motion within a fluid typically can incorporate a fluid exit hole at the bottom of a chamber, where the location of the exit hole both facilitates vortex-like rotational motion and gravity-assisted draining of the fluid. However, this location of the exit hole can make series connections between chambers problematic if a greater degree of fluid flow regulation is needed than can be provided by a single chamber.

The embodiments presented herein can address the foregoing shortcomings in the art. In particular, the present disclosure describes variable flow resistance systems that have chambers without a fluid exit hole extending through the bottom of the chamber. According to the present embodiments, the chambers instead have a fluid outlet located in a sidewall of the chamber. The primary advantage of such chambers is that they can be efficiently coupled together in series in a variable flow resistance system (e.g., in a substantially horizontal arrangement) without having to conduct excessive vertical movement of the fluid during transport between adjacent chambers. The substantially horizontal arrangement offered by the present chambers can also be particularly efficient in terms of space utilization, such that they can be readily used in confined regions, such as within a wellbore penetrating a subterranean formation. Furthermore, the opportunity to connect multiple chambers in series in a variable flow resistance system can achieve greater fluid flow regulation than is attainable using a single chamber alone.

The variable flow resistance systems described herein also offer advantages in terms of their manufacturing ease. In general, it is believed that the chambers described herein induce a lower rotational velocity (e.g., less rotational motion) in a fluid than do comparable chambers having a fluid outlet exiting through the bottom of the chamber. Although a chamber inducing less rotational motion in a fluid would appear to present an operational disadvantage, the opportunity to couple multiple chambers in series can overcome the lower fluid flow restriction provided by a single chamber of the present embodiments. From a manufacturing standpoint, however, the lower rotational velocities of the present chambers can result in lesser mechanical stress on the chamber, thereby allowing variable flow resistance systems to be constructed using materials having lower mechanical strength. For example, in some embodiments, the chambers described herein can be constructed through casting or molding of polymers, polymer composites, ceramics or metals. Materials having lower mechanical strength can oftentimes be considerably reduced in cost relative to higher performance materials needed to fabricate variable flow resistance systems having higher rotational velocities. The opportunity to use lower cost materials in variable flow resistance systems can ultimately lead to lower production costs.

In some embodiments, variable flow resistance systems described herein can comprise a chamber configured to induce rotational motion of a fluid flowing therethrough, a fluid inlet coupled to the chamber; and a fluid outlet coupled to the chamber that allows the fluid to exit through at least a sidewall of the chamber.

In some embodiments, multiple chambers can be connected in series with one another in a variable flow resistance system. In some embodiments, variable flow resistance systems described herein can comprise a plurality of chambers that are connected in series fluid communication with one another, where each chamber has a fluid inlet and a fluid outlet coupled thereto, and at least some of the chambers are configured to induce rotational motion of a fluid flowing therethrough, and the fluid outlets of at least some of the chambers are configured to allow the fluid to exit through at least a sidewall of the chamber.

When multiple chambers are connected in series in a variable flow resistance system, the chambers can all be the same in some embodiments, or at least some of the chambers can be different in other embodiments. In some embodiments, all of the chambers can have a fluid outlet that allows a fluid to exit through a sidewall of the chamber. In other embodiments, chambers having a fluid outlet that allows a fluid to exit through a sidewall of the chamber can be used in combination with chambers that have a fluid outlet exiting through the bottom of the chamber. The choice of a particular combination of chambers may be dictated by operational needs that will be evident to one having ordinary skill in the art.

As used herein, the term "chamber" refers to an enclosed space having at least one inlet and at least one outlet. As used herein, use of the term "chamber" makes no implication regarding the shape and/or dimensions of the chamber unless otherwise specified.

As used herein, the term "channel" refers to an elongated passage through which fluids can flow that is open to at least some degree along its length. In various embodiments, the closed portion of the channel can be hemispherical or semi-hemispherical (i.e., tube-like, having only one distinct surface) or trough-shaped (i.e., having two or more distinct surfaces). Furthermore, the channel can have shape or dimensional parameters that are variable along its length.

As used herein, the term "degree of curvature" refers to at least some deviation from planarity, particularly in regard to the shape of a surface. Unless otherwise specified herein, use of the term "degree of curvature" should not be construed to represent any particular amount or shape of curvature.

As used herein, the term "sidewall" refers to any surface of chamber extending between the chamber's top exterior surface and the chamber's bottom exterior surface. As used herein, the term "exterior" refers to the outside surface of a chamber that is not in contact with a fluid passing therethrough.

As used herein, the term "rotational motion" refers to the generally circular movement of a fluid about an axis of rotation, where the circular movement of the fluid exhibits at least one of angular velocity and angular acceleration. In accordance with the embodiments of the present disclosure, "rotational motion" refers to the circular flowing movement of a fluid within a chamber of a variable flow resistance system, where the circular flowing movement revolves about a central axis of the chamber.

In various embodiments, the variable flow resistance systems of the present disclosure can be used in a wellbore penetrating a subterranean formation. FIG. 2 shows a partial cross-sectional schematic of wellbore in which the variable flow resistance systems of the present disclosure can be used. As shown in FIG. 2, well 10 contains wellbore 12 having generally vertical uncased section 14, extending from cased section 16, and generally horizontal uncased section 18 extending through subterranean formation 20. Wellbore pipe 22 extends through wellbore 12, where wellbore pipe 22 can be any fluid conduit that allows fluids to be transported to and from wellbore 12. In some embodiments, wellbore pipe 22 can be a tubular string such as a production tubing string.

Continuing with FIG. 2, multiple well screens 24, each in fluid flow communication with variable flow resistance system 25, can be connected to wellbore pipe 22. Packers 26 can seal annulus 28 defined by wellbore pipe 22 and the interior surface of horizontal uncased section 18. Packers 26 can provide zonal isolation of various subterranean zones penetrated by wellbore pipe 22, thereby allowing fluids 30 to be produced from or introduced into some or all of the zones of subterranean formation 20. Well screens 24 can filter fluids 30 as they move toward the interior of wellbore pipe 22. Each variable flow resistance system 25 can regulate access of fluids 30 to the interior of wellbore pipe 22 and/or restrict the flow of certain types of fluids 30 based upon certain characteristics or physical properties thereof.

It is to be noted that the variable flow resistance systems described herein are not limited to the implementation displayed in FIG. 2, which has been presented merely for purposes of illustration and not limitation. For example, the type of wellbore in which the present variable flow resistance systems can be used is not particularly limited, and it is not necessary that wellbore 12 contain either vertical uncased section 14 or horizontal uncased section 18. Furthermore, any section of wellbore 12 can be cased or uncased, and wellbore pipe 22 can be placed in any cased or uncased wellbore section.

Furthermore, it is not necessarily the case that fluids 30 are solely produced from subterranean formation 20, since fluids can be injected into subterranean formation 20 and produced therefrom in some embodiments. In addition, the various elements coupled to wellbore pipe 22 that are presented in FIG. 2 are all optional, and each may not necessarily be used in each subterranean zone, if at all. In some embodiments, however, the various elements coupled to wellbore pipe 22 can be duplicated in each subterranean zone. Still further, zonal isolation using packers 26 need not necessarily be performed, or other types of zonal isolation techniques familiar to one having ordinary skill in the art can be used.

In various non-limiting embodiments, the present variable flow resistance systems can be used to prevent water coning or gas coning from subterranean formation 20. In some embodiments, the present variable flow resistance systems can be used to equalize pressure and balance production between heel 13 and toe 11 of wellbore 12. In other embodiments, the present variable flow resistance systems can be used to minimize the production of undesired fluids and to maximize the production of desired fluids. It is also to be recognized that the wellbore flow control devices can be used for injection operations as well to accomplish similar advantages to those noted above.

Whether a fluid is a desired fluid or an undesired fluid will usually be determined by the nature of the subterranean operation being conducted. For example, if the goal of a subterranean operation is to produce oil but not natural gas or water, the oil can be considered a desired fluid and the natural gas and water can be considered undesired fluids. In other cases, natural gas can be a desired fluid, and water can be an undesired fluid. It should be noted that at downhole temperatures and pressures, natural gas can be at least partially liquefied, and in the disclosure presented herein, the term "natural gas" or more simply "gas" will refer to a hydrocarbon gas (e.g., methane) that is ordinarily in the gas phase at atmospheric pressure and room temperature.

In general, the variable flow resistance systems described herein can be used in any subterranean operation in which there is a need to regulate the flow of fluids to or from the interior of a wellbore pipe. Reasons why one of ordinary skill in the art might wish to regulate the flow of fluids can include, for example, to prevent or minimize water and/or gas coning, to prevent or minimize water and/or gas production, to prevent or minimize sand production, to maximize oil production, to better balance production from various subterranean zones, to better equalize pressure among various subterranean zones, and/or the like.

In particular, the variable flow resistance systems described herein can be used during production or injection operations within a subterranean formation in some embodiments. In some embodiments, methods for using the variable flow resistance systems of the present disclosure can comprise: installing a wellbore pipe in an uncompleted wellbore, wherein the wellbore pipe comprises at least one variable flow resistance system that is in fluid communication with the interior of the wellbore pipe. In such embodiments, each variable flow resistance system can comprise a plurality of chambers that are connected in series fluid communication with one another, where each chamber has a fluid inlet and a fluid outlet coupled thereto, and at least some of the chambers are configured to induce rotational motion of a fluid flowing therethrough and the fluid outlets of at least some of the chambers are configured to allow the fluid to exit through at least a sidewall of the chamber.

In some embodiments, the methods can further comprise allowing a formation fluid to flow through at least some of the variable flow resistance systems and into the interior of the wellbore pipe. In some embodiments, the methods can further comprise producing the formation fluid from the wellbore pipe.

In some embodiments, the present variable flow resistance systems can be used in injection operations. For example, the variable flow resistance systems can be used to control the introduction of various types of treatment fluids into a subterranean formation. In injection operations, fluids that can be injected can include, for example, steam, liquefied gases and water. The variable flow resistance systems can be used to compensate for heel-to-toe pressure variations or permeability variations within the subterranean formation.

In some embodiments, the wellbore can comprise a horizontal wellbore. In other embodiments, the wellbore can comprise a vertical wellbore. In some embodiments, the wellbore can comprise a plurality of intervals, where there is at least one variable flow resistance system located within each interval.

The present variable flow resistance systems can comprise at least one chamber that has a fluid outlet coupled to a sidewall of the chamber. Otherwise, the design of the variable flow resistance systems and their chambers is not particularly limited. Some illustrative variable flow resistance systems meeting the above requirement are described in more detail hereinbelow with reference to the drawings. It is to be recognized that the drawings presenting variable flow resistance systems with a sidewall fluid outlet coupled to a chamber therein are for purposes of illustration and not limitation. Other implementations, orientations, arrangements and combinations of the features described hereinbelow and presented in the drawings are possible, and given the benefit of the present disclosure, it will be within the capabilities of one having ordinary skill in the art to combine these features.

Commonly owned U.S. patent application Ser. No. 12/869,836, filed Aug. 27, 2010, which is incorporated herein by reference in its entirety, describes several examples of chambers that are configured to induce rotational motion of a fluid flowing therethrough. The chambers described therein can be adapted to be compatible with those of the presently described embodiments through introduction of a sidewall fluid outlet. Specifically, in some embodiments, the chambers of the present disclosure can contain various flow-inducing structures that induce rotational motion to a fluid flowing therethrough. In some embodiments, the flow-inducing structures can be formed as vanes or recesses on or within the sidewall of the chamber. Any number of flow-inducing structures can be used within the chambers to impart a desired degree of flow resistance to a fluid passing therethrough.

Furthermore, in some embodiments, the design of the chambers can be such that only fluids having certain physical properties can undergo a desired degree of rotational motion within the chamber. That is, in some embodiments, the design of the chambers can be configured to take advantage of a fluid's physical properties such that at least one physical property dictates the fluid's rate of passage through the chamber. Specifically, fluids having certain physical properties (e.g., viscosity, velocity and/or density) can be induced to undergo greater rotational motion when passing through the chamber, thereby increasing their transit time relative to fluids lacking that physical property. For example, in some embodiments, the chamber can be configured to induce increasing rotational motion of a fluid with decreasing fluid viscosity. Consequently, in such embodiments, a fluid having a greater viscosity (e.g., oil) can undergo less rotational motion when passing through the chamber than does a fluid having a lower viscosity (e.g., gas or water), and the high viscosity fluid can have its transit time through a flow pathway affected to a much lesser degree than does the low viscosity fluid.

Various types of sidewall fluid outlets are compatible with the variable flow resistance systems described herein. In some embodiments, the fluid outlet can comprise a channel within the chamber that extends from the top or bottom interior surface of the chamber and through at least a sidewall of the chamber. That is, the channel can be defined within the top or bottom interior surface of the chamber, but the channel extends through the sidewall of the chamber, not the top or bottom of the chamber. In some embodiments, the fluid outlet can comprise a cone-shaped fluid outlet that extends through at least a sidewall of the chamber. In some embodiments, the fluid outlet can comprise at least one hole within the sidewall of the chamber. In still other embodiments, the fluid outlet can comprise at least one groove or slit within the sidewall of the chamber. Other types of fluid outlets can include, for example, curved pathways, helical pathways, pathways with directional changes, and segmented pathways with diameter variations. Combinations of different fluid outlet types are also possible.

Figure 3A:
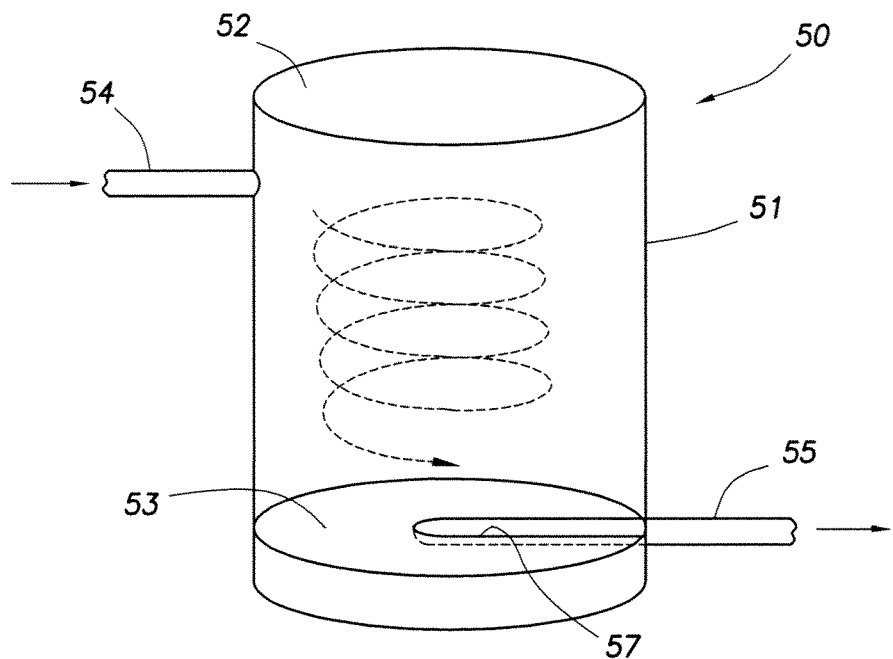
FIG. 3A shows a side view schematic of a variable flow resistance system having a single chamber with a channel extending from the bottom interior surface of the chamber though a sidewall of the chamber.
Figure 3B:
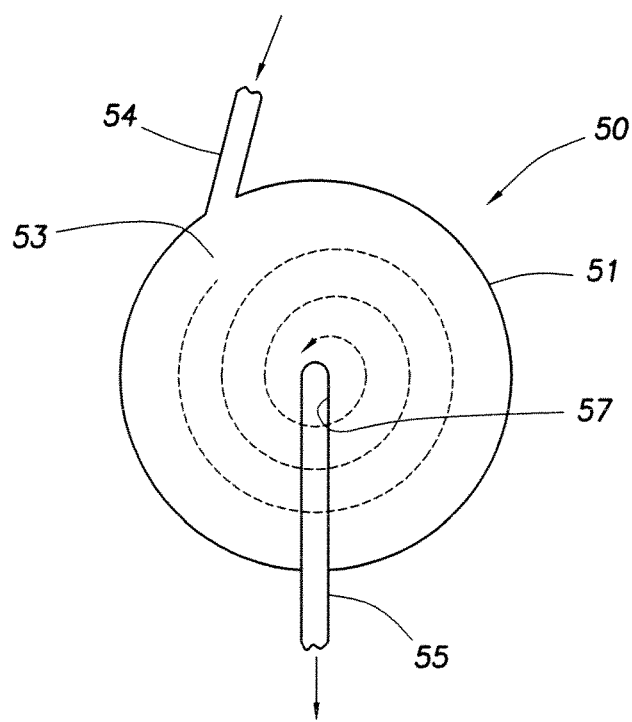
FIG. 3B shows a cutaway top view schematic of a variable flow resistance system having a single chamber with a channel extending from the bottom interior surface of the chamber though a sidewall of the chamber.

FIG. 3A shows a side view schematic of a variable flow resistance system having a single chamber with a channel extending from the bottom interior surface of the chamber though a sidewall of the chamber. FIG. 3B shows a cutaway top view schematic of a variable flow resistance system having a single chamber with a channel extending from the bottom interior surface of the chamber though a sidewall of the chamber. As shown in FIGS. 3A and 3B, chamber 50 having sidewall 51, top interior surface 52 and bottom interior surface 53 has fluid inlet 54 and fluid outlet 55 coupled thereto. Chamber 50 has channel 57 defined in bottom interior surface 53 that establishes a fluid flow pathway extending through sidewall 51 to fluid outlet 55. According to the present embodiments, channel 57 and fluid outlet 55 do not extend through the bottom exterior surface of chamber 50.

Figure 3C:
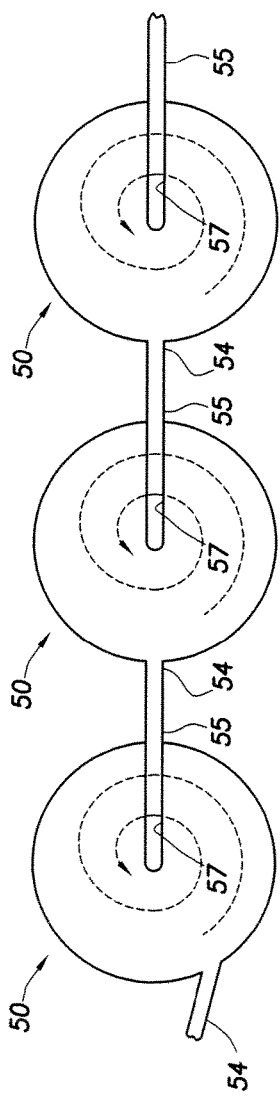
FIGS. 3C and 3D show cutaway top view schematics of a variable flow resistance system having multiple chambers coupled to one another in series.
Figure 3D:
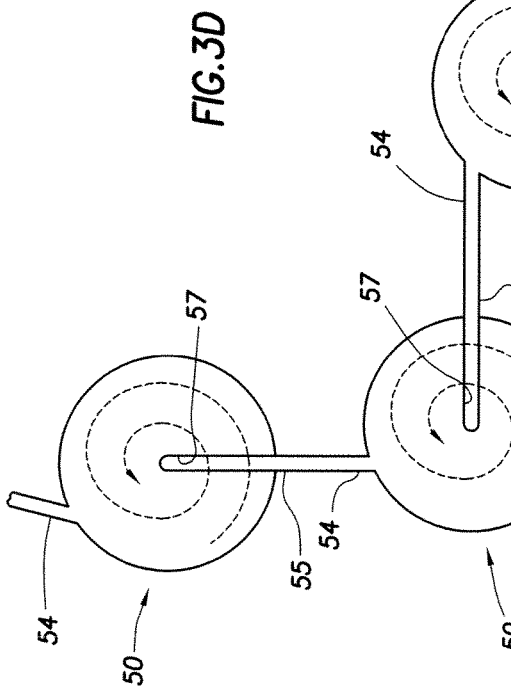

FIGS. 3C and 3D show cutaway top view schematics of a variable flow resistance system having multiple chambers coupled to one another in series. In FIG. 3C, fluid inlet 54 and fluid outlet 55 are configured such that multiple chambers 50 are series connected in a substantially linear fashion. In FIG. 3D, fluid inlet 54 and fluid outlet 55 are configured such that the multiple chambers 50 are connected in a non-linear fashion. According to the present embodiments, fluid outlet 55 of one chamber can couple to fluid inlet 54 of a subsequent chamber to establish the series connection therebetween. Any combination of linear and non-linear arrangements of chambers 50 can be used within the spirit and scope of the present disclosure. Furthermore, fluid outlet 55 is not limited to being coupled to channel 57, as drawn in FIGS. 3A-3D. Other routes for a fluid's exit from a chamber via its sidewall are described in more detail hereinbelow and can be used in variable flow resistance system comparable to those presented in FIGS. 3A-3D.

Figure 3E:
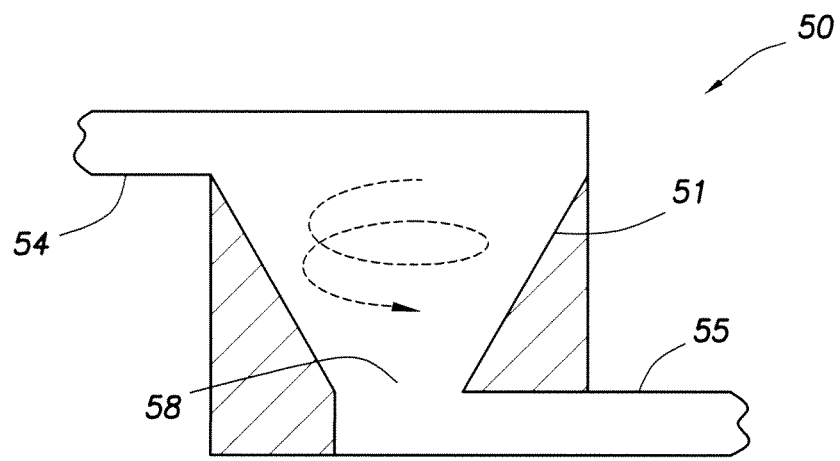
FIG. 3E shows a side view schematic of a variable flow resistance system having a single chamber with a cone-shaped fluid exit extending from the bottom interior surface of the chamber though a sidewall of the chamber.

In some alternative embodiments, channel 57 of FIGS. 3A-3D can be replaced with a cone-shaped fluid exit that extends through a sidewall of chamber 50. FIG. 3E shows a side view schematic of a variable flow resistance system having a single chamber 50 with a cone-shaped fluid exit 58 extending from the bottom interior surface of the chamber though sidewall 51 of the chamber.

Figure 4A:
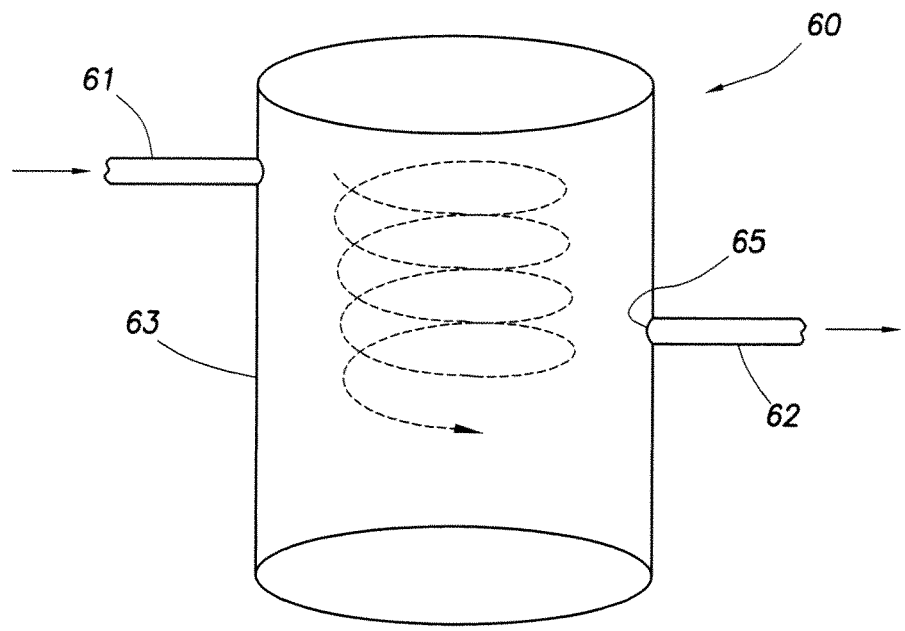
FIGS. 4A and 4B show side view schematics of a variable flow resistance system having a single chamber that has either a single hole (FIG. 4A) or multiple holes (FIG. 4B) within its sidewall.
Figure 4B:
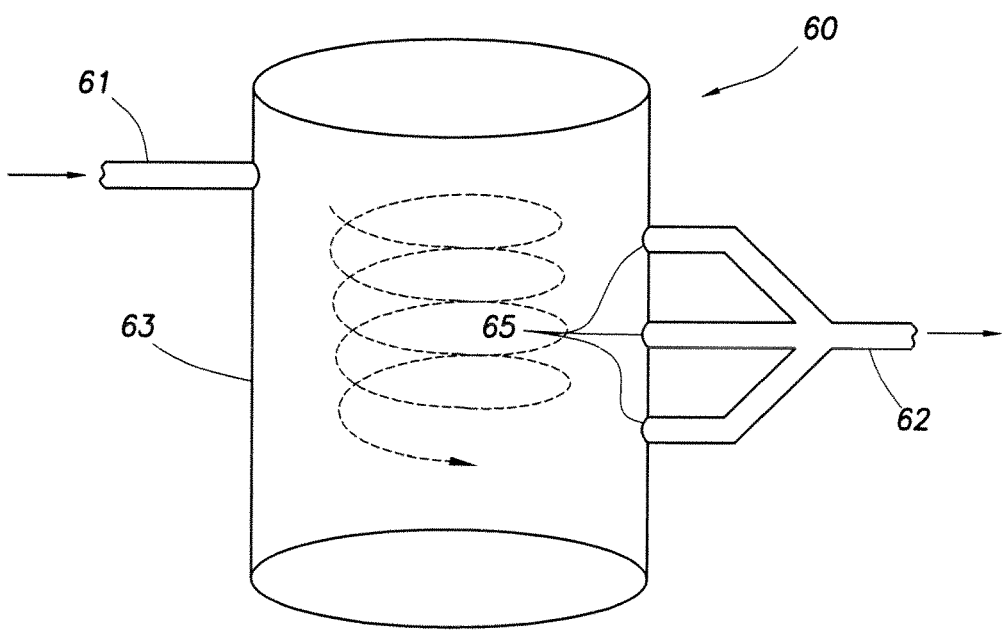

FIGS. 4A and 4B show side view schematics of a variable flow resistance system having a single chamber that has either a single hole (FIG. 4A) or multiple holes (FIG. 4B) within its sidewall. As shown in FIGS. 4A and 4B, chamber 60 has fluid inlet 61 and fluid outlet 62 coupled thereto. A fluid can exit chamber 60 through sidewall 63 via hole(s) 65 and travel through fluid outlet 62. As shown in FIG. 4B, fluid passing through each hole 65 can be rejoined into a single-stream fluid output. In alternative embodiments, fluid passing through each hole 65 can remain as a separated fluid output stream (not shown), each of which can then separately enter a subsequent chamber. Series coupling of the chambers to one another can be accomplished in a manner similar to that shown in FIGS. 3C and 3D above, where the chamber arrangement can again be either substantially linear or non-linear. Furthermore, it is to be recognized that hole(s) 65 can be replaced in any of the various embodiments with openings such as slits or grooves to achieve a like result.

It is to be recognized that whether a substantially linear or non-linear arrangement of chambers is chosen for a multi-chamber variable flow resistance system will be a matter of operational needs, and one of ordinary skill in the art will be able to implement a preferred orientation of chambers for a particular application. Furthermore, it is to be recognized that the depiction of certain numbers of chambers in the drawings should not be construed as limiting. According to the present embodiments, any number of chambers can be series coupled in a multi-chamber variable flow resistance system, including, for example, 2 chambers to about 20 chambers in some embodiments, or 2 chambers to about 10 chambers in other embodiments, or 2 chambers to about 5 chambers in still other embodiments. Of course, the chambers can be used singularly in a variable flow resistance system, if desired.

Figure 5A:
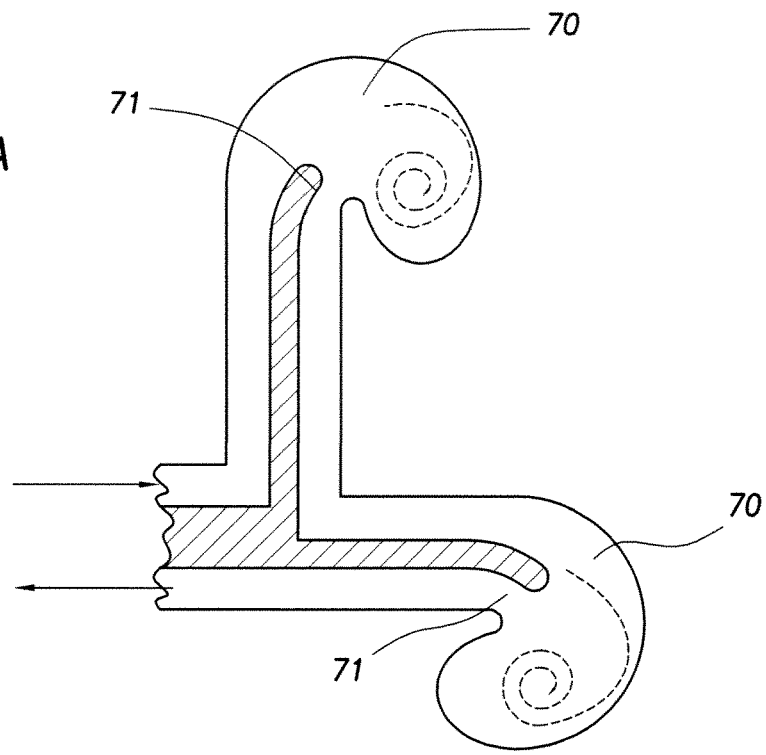
FIGS. 5A-5C show cutaway top view schematics of illustrative variable flow resistance systems having multiple chambers coupled in series via a sidewall fluid outlet.
Figure 5B:
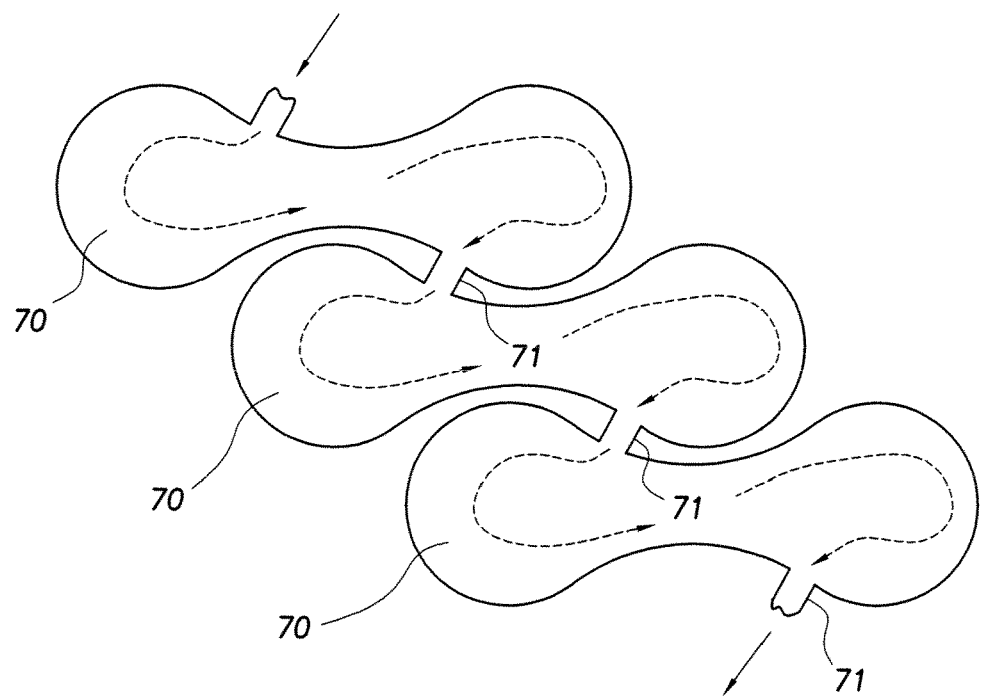
Figure 5C:
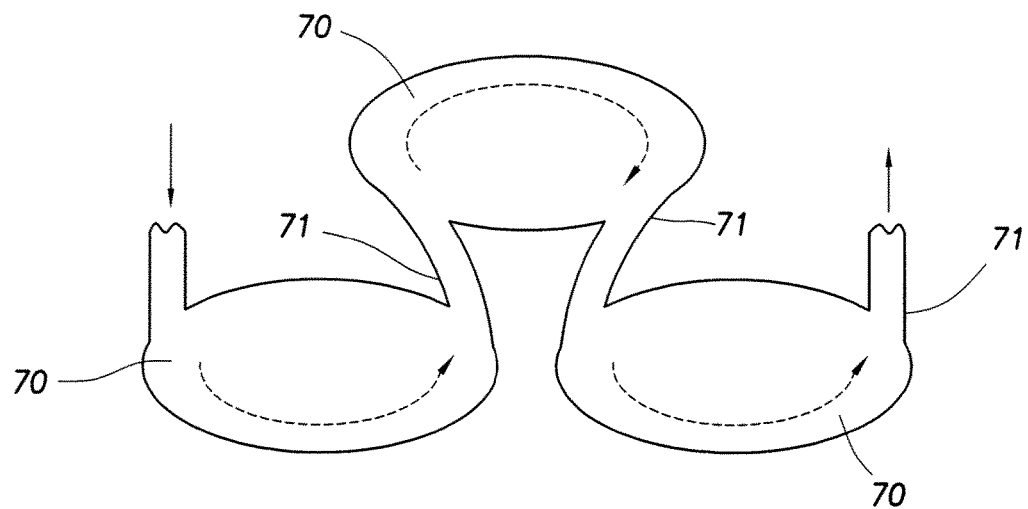

In addition to the illustrative arrangements of multiple chambers that are depicted in FIGS. 3C and 3D, other chamber arrangements are also possible when a fluid outlet extends through the sidewall of the chamber. FIGS. 5A-5C show cutaway top view schematics of illustrative variable flow resistance systems having multiple chambers 70 coupled in series via sidewall fluid outlet 71. Some of these alternative chamber arrangements allow a particularly efficient utilization of space to be realized (see FIGS. 5A and 5B, for example). Again, it should be emphasized that the chamber arrangements presented in FIGS. 5A-5C are for purposes of illustration and not limitation, and any series-connected arrangement of multiple chambers in a variable flow resistance system can be used within the spirit and scope of the present disclosure.

As illustrated in FIGS. 5A-5C, the shape of the chambers in the present variable flow resistance systems is not particularly limited. However, it is to be understood the chambers of the present embodiments are not limited to the shapes set forth in those or any other drawing unless otherwise expressly set forth herein. In some embodiments, at least a portion of the sidewall of a given chamber can have at least some degree of curvature. In some embodiments, the degree of curvature can be substantially uniform about the interior of the chamber. That is, the chamber can be approximately circular in such embodiments. In other embodiments, the degree of curvature can vary about the interior of the chamber. For example, the chamber can be approximately elliptical in some embodiments. In embodiments in which the degree of curvature can vary, considerably more complex shapes of the chamber can become possible (for example, see FIG. 5B). In still other embodiments, a chamber having a portion of its sidewalls with a degree of curvature and a portion of its sidewalls substantially planar can also be used, if desired.

Although FIGS. 3A-3E, 4A-4B and 5A-5C have shown some particular orientations of the fluid inlet and the fluid outlet relative to one another, the spatial arrangement of these elements should not be considered to be particularly limited in any regard. In some embodiments, the location of the fluid inlet can be such that rotational motion is induced in the fluid as it enters the chamber. For example, the chamber and fluid inlet can be configured such that fluid entering the chamber is introduced along a curved sidewall of the chamber, which can set the fluid into rotational motion within the chamber. Furthermore, there are no limitations regarding the separation of the fluid inlet and the fluid outlet from one another along the sidewalls of the chamber. Generally, at least some degree of separation can be maintained between the fluid inlet and the fluid outlet so that an undesired fluid does not enter the fluid outlet without first undergoing rotational motion, but this is not necessarily the case. Finally, the fluid inlet and the fluid outlet can be located at any height relative to one another. In some embodiments, the fluid inlet can be below the fluid outlet. In other embodiments, the fluid inlet can be above the fluid outlet. In still other embodiments, the fluid inlet and the fluid outlet can be at approximately the same height above the bottom of the chamber.

In some embodiments, there can be a single fluid inlet coupled to the chamber(s) of the variable flow resistance systems. In other embodiments, there can be more than one fluid inlet coupled to the chamber(s) of the variable flow resistance systems.

In some embodiments, there can be a single fluid outlet coupled to the chamber(s) of the variable flow resistance systems. In other embodiments, there can be more than one fluid outlet coupled to the chamber(s) of the variable flow resistance systems. That is, in some embodiments, a fluid can exit the chamber(s) at more than one point. In some embodiments, a channel extending from the top or bottom interior surface of the chamber can extend through a sidewall of the chamber(s) at more than one point. In some or other embodiments, there can be multiple holes or like exit ports within the sidewall of the chamber(s). The presence of multiple fluid outlets within the chamber(s) can allow a variable flow resistance system having a "branched" arrangement of chambers to be constructed.

Figure 6A:
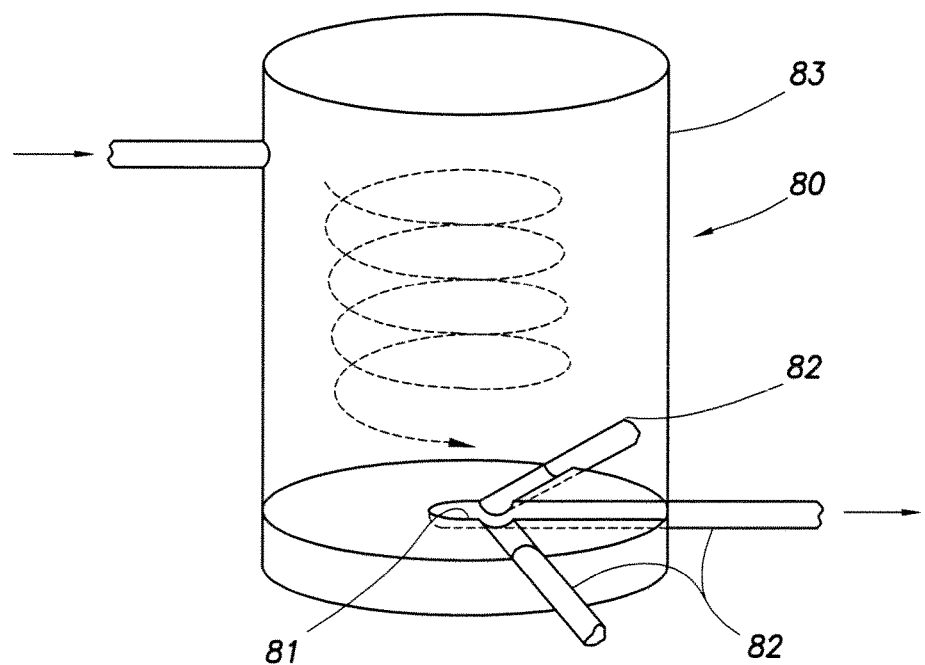
FIGS. 6A and 6B show side view schematics of a variable flow resistance system having a chamber with multiple fluid outlets.
Figure 6B:
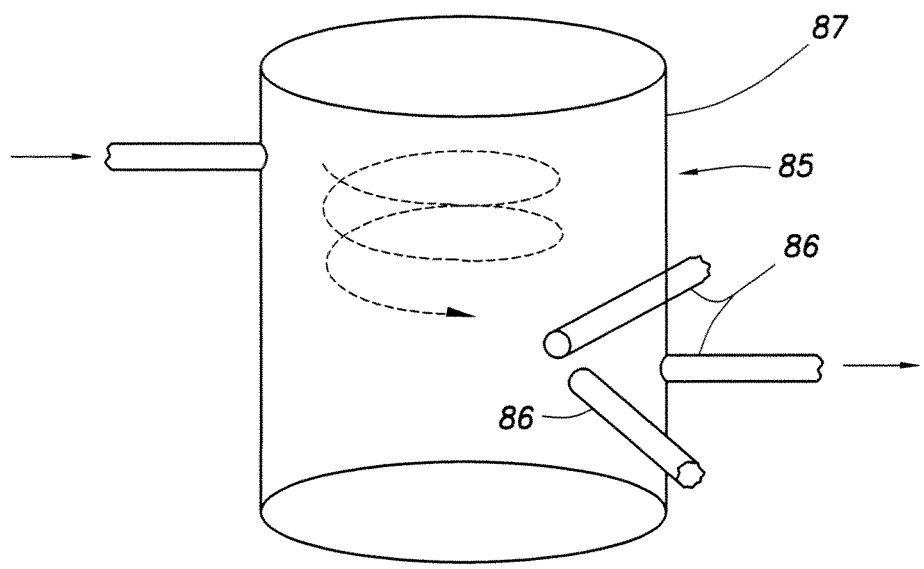
Figure 6C:
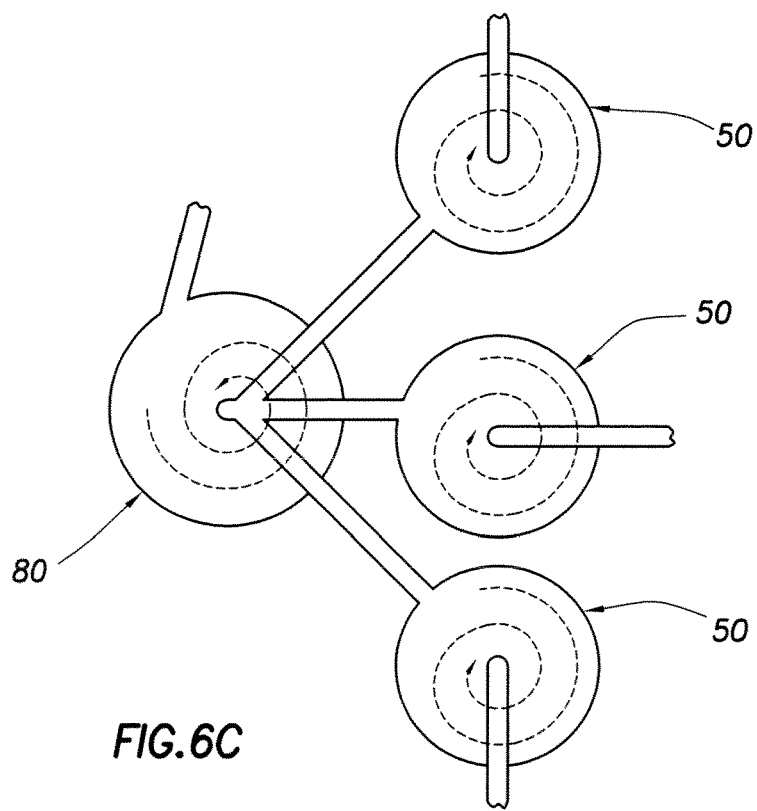
FIG. 6C shows a cutaway top view schematic of a variable flow resistance system in which the chamber of FIG. 6A has been used to form a branched arrangement of multiple chambers coupled in series.

FIGS. 6A and 6B show side view schematics of a variable flow resistance system having a chamber with multiple fluid outlets. FIG. 6A shows chamber 80 in which channel 81 splits into multiple fluid outlets 82 extending through sidewall 83 of the chamber. FIG. 6B shows chamber 85 in which there are multiple holes 86 extending through sidewall 87 of the chamber. FIG. 6C shows a cutaway top view schematic of a variable flow resistance system in which the chamber of FIG. 6A has been used to form a branched arrangement of multiple chambers coupled in series. Although FIG. 6C has shown only a single branch initiated from chamber 80, it is to be recognized that further branching can take place if desired by replacing any of chamber(s) 50 with chamber 80 or a like chamber having multiple fluid outlets. Further, it should be recognized that any number of fluid outlets can extend from a sidewall of chamber 80, and the depiction of three fluid outlets in FIGS. 6A-6C should be considered to be for purposes of illustration and not limitation.

The rotational motion induced within a fluid passing through the chambers of the present disclosure can be in any direction relative to the forward motion of the fluid. In some embodiments, the rotational motion can be substantially normal to the direction of the fluid flow. That is, in the chamber of FIG. 3A or another like chamber described herein, the rotational motion can take place as the fluid passes along the sidewalls of the chamber while it passes to the fluid outlet. In some embodiments, the chamber can be configured such that the rotation motion occurs in the same direction as the fluid flow, that is, substantially parallel to the fluid flow. In some embodiments, the chamber can be configured such that rotational motion of the fluid occurs at least partially in parallel to the direction of the fluid flow. In some embodiments, the rotational motion can occur with a component that is substantially normal and a component that is substantially parallel to the fluid flow.

Figure 7A:
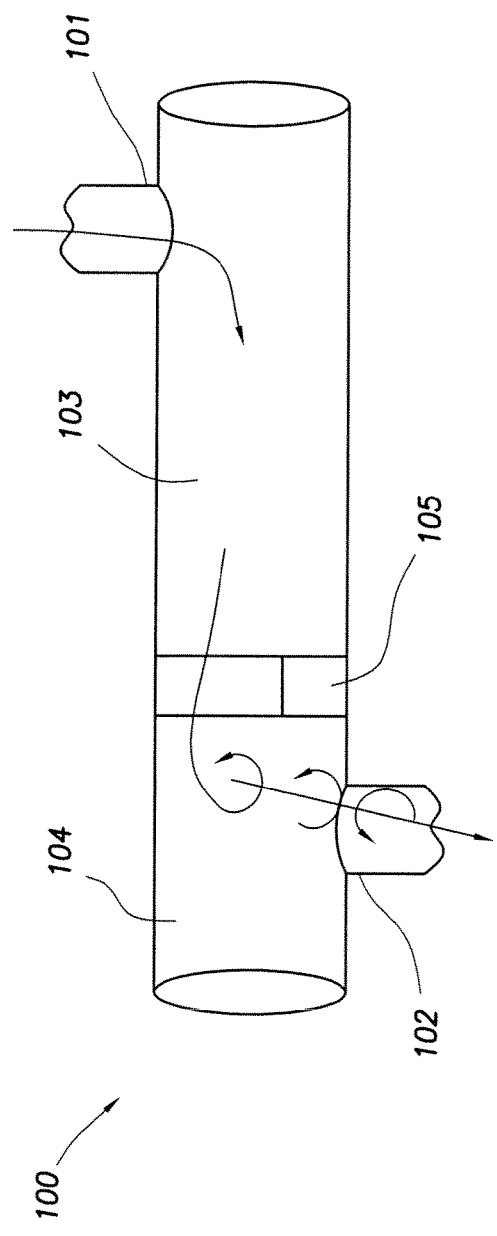
FIGS. 7A and 7B show side view schematics of an illustrative variable flow resistance system in which rotational motion of the fluid occurs at least partially in parallel to the direction of the fluid flow.
Figure 7B:
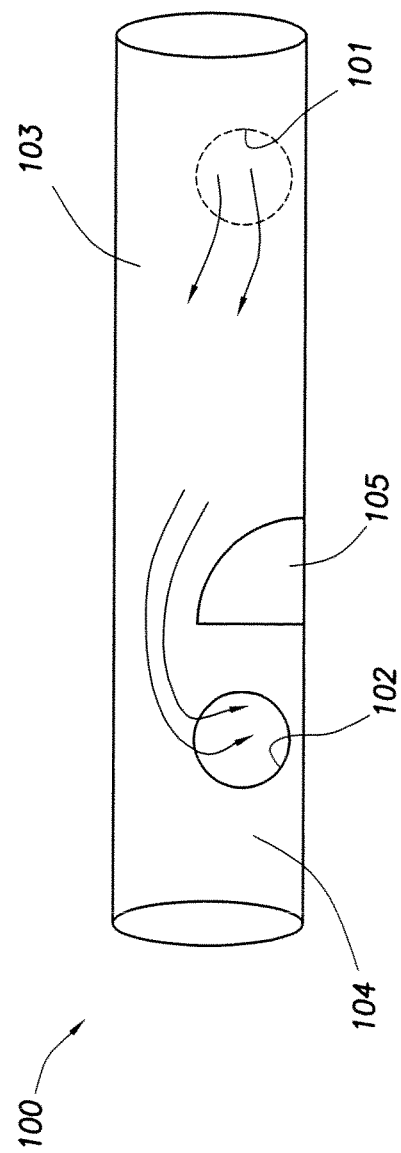

FIGS. 7A and 7B show side view schematics of an illustrative variable flow resistance system in which rotational motion of the fluid occurs at least partially in parallel to the direction of the fluid flow. As shown in FIGS. 7A and 7B, a fluid enters chamber 100 through fluid inlet 101 and exits through fluid outlet 102. In region 103, the fluid can either rotate substantially normal to the forward direction of fluid motion or not rotate to a significant degree. Once the fluid progresses forward and encounters vane 105, rotational motion is induced in the fluid in region 104, where the rotational motion is at least partially in parallel to the forward direction of the fluid motion.

Figure 8A:
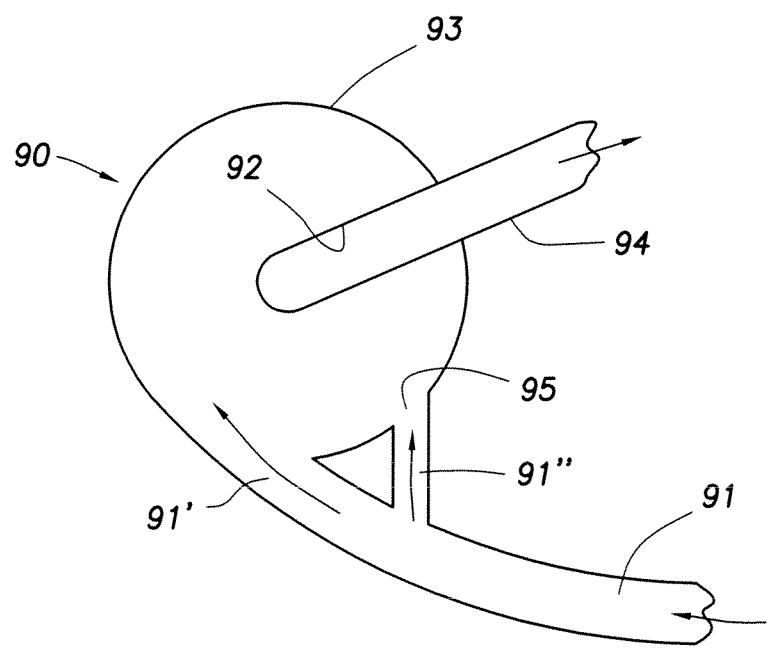
FIG. 8A shows a cutaway top view schematic of a variable flow resistance system having a chamber with both a main flow pathway and a branch flow pathway within the fluid inlet.

In some embodiments, the fluid inlets coupled to the chambers of the present disclosure can comprise both a main flow pathway and a branch flow pathway. In some embodiments, the branch flow pathway can be configured such that fluid entering the branch flow pathway does not undergo rotational motion or undergoes less rotational motion than fluid entering the main flow pathway. FIG. 8A shows a cutaway top view schematic of a variable flow resistance system having a chamber with both a main flow pathway and a branch flow pathway within the fluid inlet. As shown in FIG. 8A, chamber 90 includes fluid inlet 91 and channel 92 extending through sidewall 93 into fluid outlet 94. Fluid inlet 91 further comprises main flow pathway 91' and branch flow pathway 91". As one of ordinary skill in the art will recognize, low viscosity fluids, such as water or gas, will tend to enter main flow pathway 91', since they have a higher ratio of momentum to viscosity than more viscous fluids (e.g., oil), such that they tend not to make the turn into branch flow pathway 91". More viscous fluids, in contrast, by virtue of their lower ratio of momentum to viscosity can more readily make the required turn into branch flow pathway 91". Outlet 95 of branch flow pathway 91" can be located within chamber 90 such that high viscosity fluid passing therethrough can undergo less rotational motion via bypassing the portion of chamber 90 that induces rotational motion in the fluid and/or by being located in or near channel 92, which leads to fluid outlet 94. In some embodiments, outlet 95 can completely bypass chamber 90 such that a fluid passing therethrough is discharged directly into outlet 94.

Figure 8B:
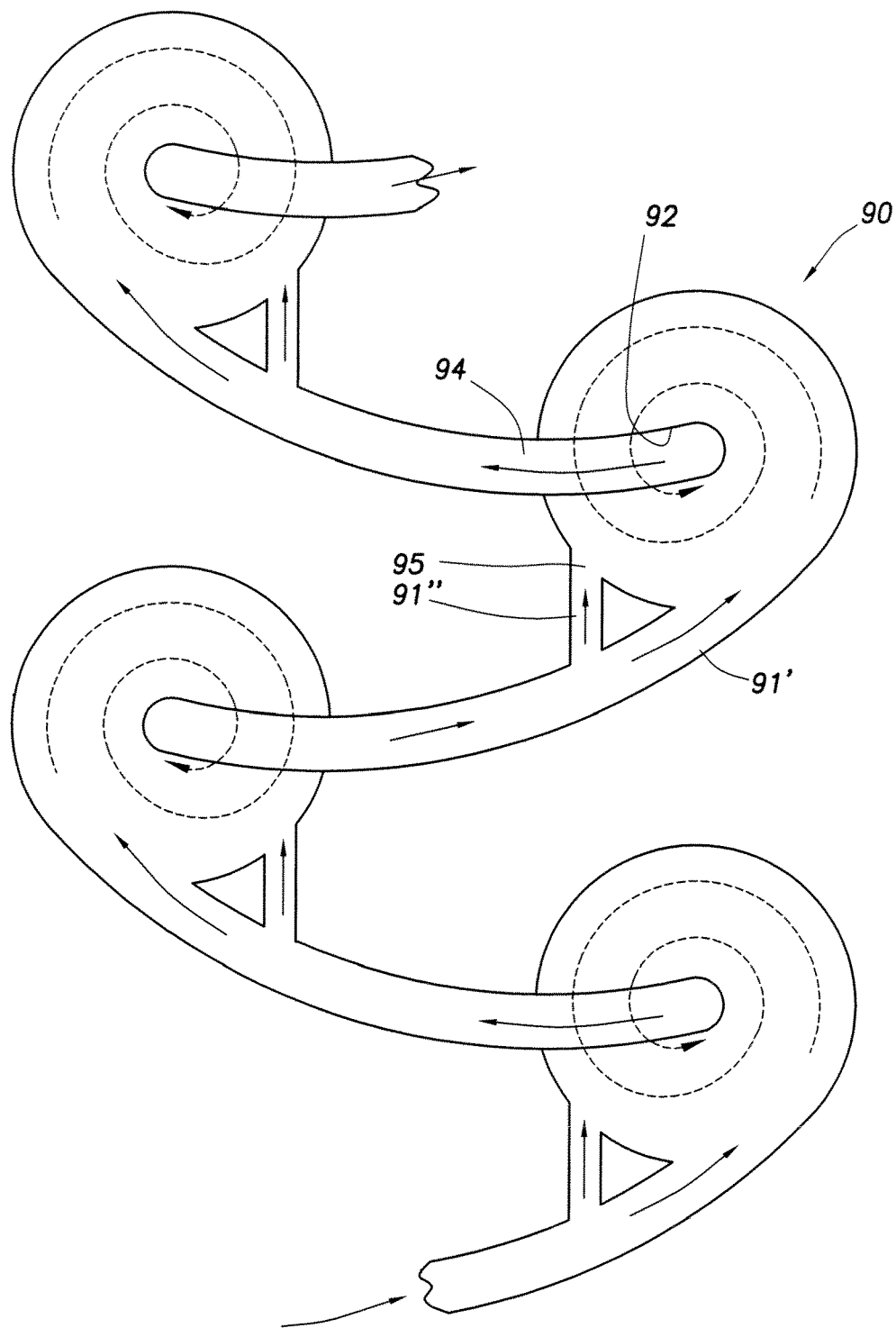
FIGS. 8B and 8C show cutaway top view schematics of a variable flow resistance system in which multiple chambers having a fluid inlet with a main flow pathway and a branch flow pathway are series coupled together.
Figure 8C:
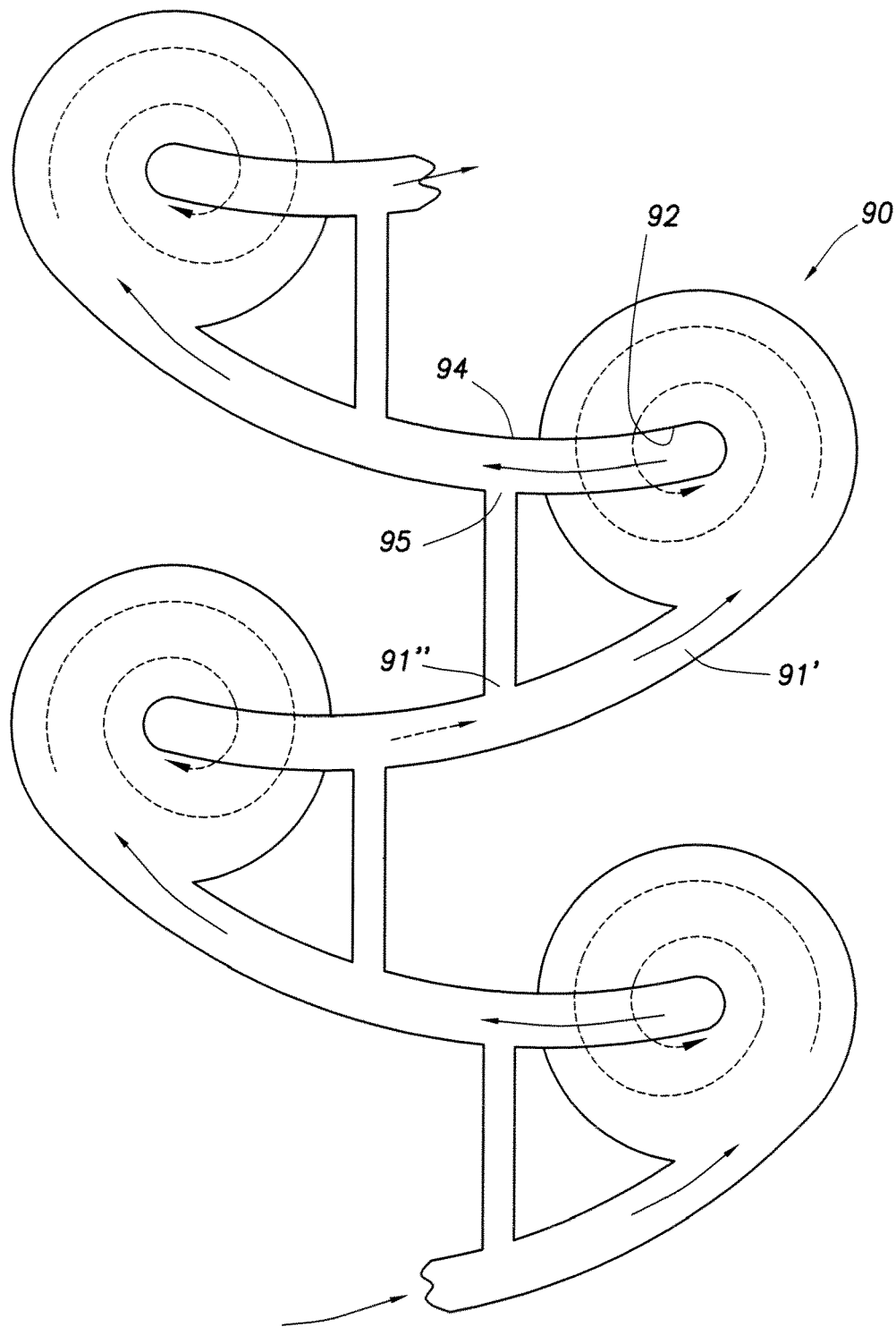

Similar to the embodiments described above, chambers having fluid inlets with both main and branch flow pathways can likewise be series coupled to one another. FIG. 8B shows a cutaway top view schematic of a variable flow resistance system in which multiple chambers having a fluid inlet with a main flow pathway and a branch flow pathway are series coupled together. As drawn in FIG. 8B, outlet 95 of branch flow pathway 91" discharged near channel 92. FIG. 8C shows an alternative embodiment to that presented in FIG. 8B, in which fluid outlet 95 of branch flow pathway 91" is discharged directly into fluid outlet 94, thereby preventing a fluid passing therethrough from undergoing rotational motion. In FIG. 8C, branch flow pathway 91" is structurally connected to fluid outlet 95, thereby allowing chamber 90 to be bypassed altogether. In both cases, main flow pathway 91' discharges into chamber 90 and fluid therein can undergo rotational motion.

Figure 9:
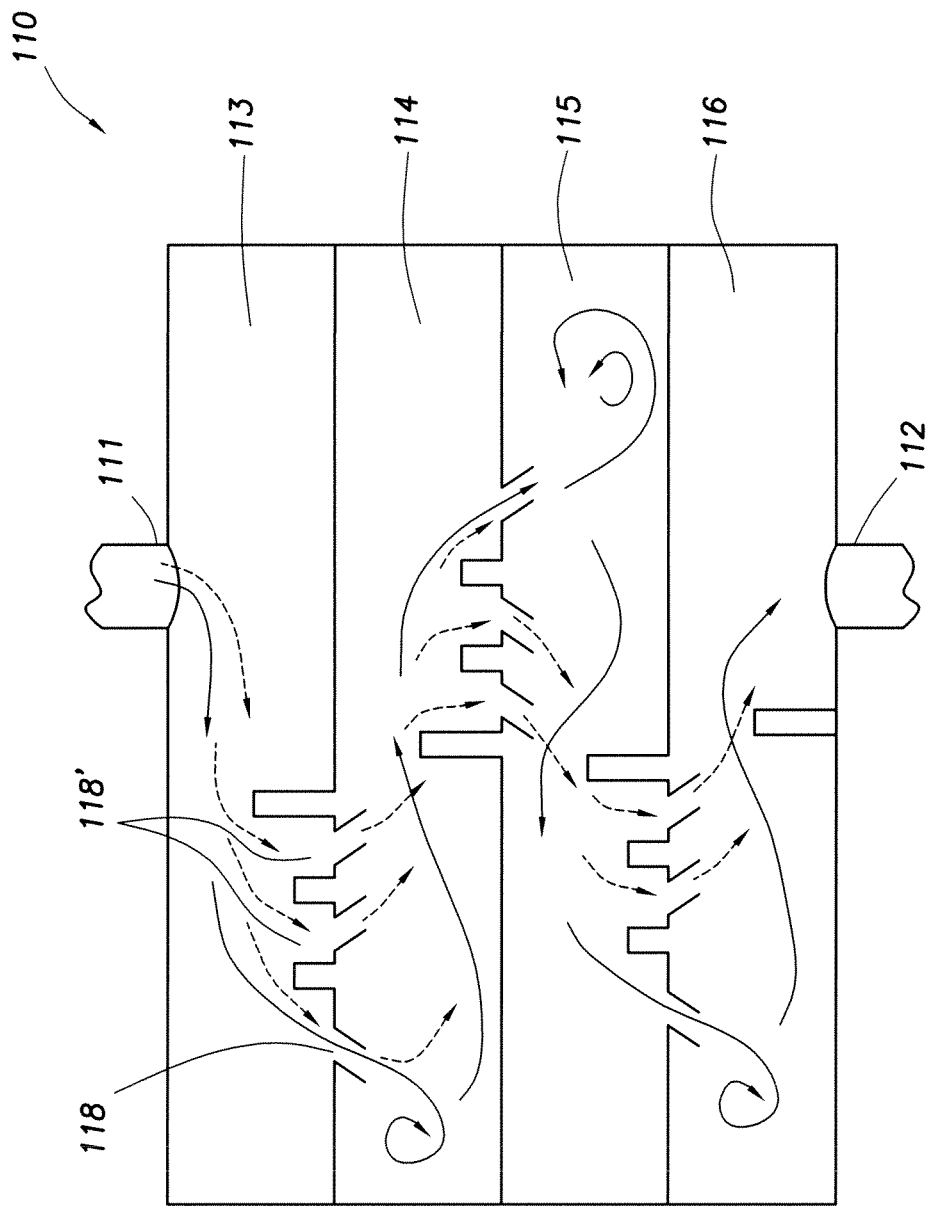
FIG. 9 shows a side view schematic of a variable flow resistance system having multiple fluid inlets and fluid outlets interconnecting chambers of the system.

Another embodiment of a variable flow resistance system having a branch flow pathway is shown in FIG. 9. FIG. 9 shows a side view schematic of a variable flow resistance system 110 having multiple fluid inlets 111 and fluid outlets 112 interconnecting chambers 113, 114, 115 and 116. Lower viscosity fluids (solid line) such as, for example, oil and gas can enter main flow pathway 118 and undergo rotational motion within chamber 114. The lower viscosity fluids can subsequently bypass branch flow pathways in chambers 114 and 115 and undergo additional rotational motion in these chambers. In contrast, a higher viscosity fluid (dashed line) such as oil, for example, can enter branch flow pathway 118'. As the higher viscosity fluid enters chamber 114, it has less opportunity to undergo rotational motion and can subsequently enter branch flow pathways in chambers 114 and 115. Accordingly, the transit rate of the higher viscosity fluid relative to the lower viscosity fluid can be increased.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A variable flow resistance system comprising:
a plurality of chambers connected in series fluid communication with one another, each chamber having a fluid inlet and a fluid outlet coupled thereto, each fluid inlet and fluid outlet being disposed on a sidewall of a respective chamber of the plurality of chambers;
wherein at least a first one of the plurality of chambers is cylindrical to-induce rotational motion of a fluid flowing therethrough and has a top that provides a top interior surface and a top exterior surface, a bottom that provides a bottom interior surface and a bottom exterior surface, and the cylindrical-sidewall, the sidewall being non-porous and coupled to and extending from the top exterior surface and to the bottom exterior surface, the cylindrical sidewall forming a cone-shaped fluid exit extending between the fluid inlet and the fluid outlet; and
wherein the fluid outlet of at least the first one of the plurality of chambers is coupled to the cone-shaped fluid exit to allow the fluid to exit of the chamber through the cylindrical sidewall via the cone-shaped fluid exit in a same direction as the fluid enters the fluid inlet, the fluid inlet of one or more of the plurality of chambers comprise a main flow pathway and a branch flow pathway; and
wherein the branch flow pathway is configured such that fluid entering the branch flow pathway does not undergo rotational motion or undergoes less rotational motion than fluid entering the main flow pathway.

2. The variable flow resistance system of claim 1, wherein one or more of the plurality of chambers are configured such that the rotational motion occurs in the same direction as the fluid flow.

3. The variable flow resistance system of claim 1, wherein one or more of the plurality of chambers have at least some degree of curvature in at least a portion of a respective sidewall of each chamber.

4. The variable flow resistance system of claim 1, wherein the fluid outlet of one or more of the plurality of chambers comprises at least one hole in the respective sidewall of each chamber.

5. A method comprising:
installing a wellbore pipe in a wellbore, the wellbore pipe comprising at least one variable flow resistance system in fluid communication with an interior of the wellbore pipe, the at least one variable flow resistance system comprising:
a plurality of chambers connected in series fluid communication with one another, each chamber having a fluid inlet and a fluid outlet coupled thereto, each fluid inlet and fluid outlet being disposed on a sidewall of a corresponding chamber of the plurality of chambers;
wherein at least a first one of the plurality of chambers is cylindrical to induce rotational motion of a fluid flowing therethrough and has a top that provides a top interior surface and a top exterior surface, a bottom that provides a bottom interior surface and a bottom exterior surface, and the cylindrical sidewall, the sidewall being non-porous and coupled to and extending from the top exterior surface and to the bottom exterior surface, the cylindrical sidewall forming a cone-shaped fluid exit extending between the fluid inlet and the fluid outlet; and
wherein the fluid outlet of at least the first one of the plurality of chambers is coupled to the cone-shaped fluid exit to allow the fluid to exit the chamber through the cylindrical sidewall via the cone-shaped fluid exit in a same direction as the fluid enters the fluid inlet, and the fluid inlet of one or more of the plurality of chambers comprise a main flow pathway and a branch flow pathway; and
wherein the branch flow pathway is configured such that fluid entering the branch flow pathway does not undergo rotational motion or undergoes less rotational motion than fluid entering the main flow pathway.

6. The method of claim 5, further comprising:
allowing a formation fluid to flow through the at least one variable flow resistance system and into the interior of the wellbore pipe; and
producing the formation fluid from the wellbore pipe.

7. The method of claim 5, wherein the wellbore comprises a horizontal wellbore.

8. The method of claim 5, wherein the wellbore penetrates a subterranean formation comprising a plurality of intervals; and
wherein there is at least one variable flow resistance system within each interval.

* * * * *